United States Patent [19]
Takizawa

[11] Patent Number: 5,260,815
[45] Date of Patent: Nov. 9, 1993

[54] LIGHT WRITING TYPE PROJECTION DISPLAY USING POLYMER-DISPERSED LIQUID CRYSTAL AND LIQUID CRYSTAL TELEVISION SET AS IMAGE LIGHT SOURCE

[75] Inventor: Kuniharu Takizawa, Tokyo, Japan
[73] Assignee: Nippon Hoso Kyokai, Tokyo, Japan
[21] Appl. No.: 734,309
[22] Filed: Jul. 19, 1991

Related U.S. Application Data

[63] Continuation-in-part of Ser. No. 655,379, Mar. 5, 1991, abandoned.

[30] Foreign Application Priority Data

Aug. 3, 1989 [JP] Japan ................. 3-200298

[51] Int. Cl.$^5$ .............. G02F 1/133; G02F 1/135; H04N 5/74; G09F 9/30
[52] U.S. Cl. ......................... 359/41; 359/42; 359/49; 359/51; 359/74; 359/72; 358/61; 353/31; 353/34
[58] Field of Search ........... 359/40, 71, 41, 98, 359/42, 54, 48, 49, 50, 72, 74, 259, 294, 316, 318; 358/61, 236; 340/784; 353/31, 34, 81, 82, 122

[56] References Cited

U.S. PATENT DOCUMENTS

| | | | |
|---|---|---|---|
| 4,127,322 | 11/1978 | Jacobson et al. | 359/72 |
| 4,299,447 | 11/1981 | Soltan et al. | 359/42 |
| 4,389,096 | 6/1983 | Hori et al. | 359/41 |
| 4,613,207 | 9/1986 | Fergason | 350/334 |
| 4,699,498 | 10/1987 | Naemura et al. | 359/40 |
| 4,707,077 | 11/1987 | Marom | 350/342 |
| 4,723,077 | 2/1988 | Wu | 359/40 |

(List continued on next page.)

FOREIGN PATENT DOCUMENTS

| | | | |
|---|---|---|---|
| 0111846 | 9/1979 | Japan | 350/342 |
| 0139569 | 10/1979 | Japan | 350/342 |
| 109422 | 5/1988 | Japan | |
| 231479 | 9/1988 | Japan | |
| 147428 | 6/1989 | Japan | |

OTHER PUBLICATIONS

Takizawa et al. "Transmission mode spatial light modulator using a $B_{12}SiO_{20}$ crystal and polymer-dispersed liquid crystal layers" Appl. Phys. Letter 56 (11)—Mar. 12, 1990–pp. 999-1001.

(List continued on next page.)

*Primary Examiner*—William L. Sikes
*Assistant Examiner*—Tai V. Duong
*Attorney, Agent, or Firm*—Spencer, Frank & Schneider

[57] ABSTRACT

A light writing type projection display for inputting two-dimensional information such as images or data patterns into a spatial light modulator by using a write light beam, and displaying the information on a screen by using a display light beam. The projection display comprises a light write type spatial light modulator, and either a cathode ray tube or a liquid crystal television set. The modulator includes an antireflection film, a glass substrate, a transparent electrode, a liquid crystal composition, a dielectric mirror, a light absorption layer, a photoconductive layer, a transparent electrode and a fiber optic plate which are laminated in the recited sequence. The liquid crystal composition includes one of a nematic liquid crystals, cholesteric liquid crystals, and smectic liquid crystals combined with a resin matrix. The resin matrix has a refractive index equal to or approximately equal to the ordinary or extraordinary refractive index of the liquid crystals, or equal to or approximately equal to the refractive index of the randomly oriented liquid crystals. The liquid crystals are enclosed and scattered in the resin matrix, or the resin matrix is enclosed and scattered in the liquid crystals. The projected light beam is thrown on a screen by using a display beam light source and the projection optical system. Compared with the conventional displays, the display is superior in brightness, contrast ratio, spatial uniformity of the display image and response time. Analog motion images can be displayed by using a schlieren optical system.

6 Claims, 16 Drawing Sheets

U.S. PATENT DOCUMENTS

| | | | |
|---|---|---|---|
| 4,743,097 | 5/1988 | Johnson et al. | 359/41 |
| 4,772,101 | 9/1988 | Liu | 359/41 |
| 4,818,070 | 4/1989 | Gunjima et al. | 350/351 |
| 4,877,307 | 10/1989 | Kalmanash | 359/465 |
| 5,040,877 | 8/1991 | Bline et al. | 359/53 |
| 5,071,230 | 12/1991 | Hatano et al. | 359/72 |
| 5,083,854 | 1/1992 | Zampolin et al. | 359/72 |
| 5,132,814 | 7/1992 | Ohkaudi et al. | 359/72 |
| 5,150,232 | 9/1992 | Gunkima et al. | 359/53 |
| 5,153,759 | 10/1992 | Haas et al. | 359/72 |

OTHER PUBLICATIONS

K. Takizawa et al.-"Reflection mode spatial light modulator using polymer-dispersed liquid crystal and BSO crystal" Applied Physics Society-Autumn 1989—28 p-Zd-6.

Grinberg et al.-"Liquid Crystal Light Valve for Coherent Optical Data Processing" Conference of Applications of Holography and Optical Data Processing-Israel-Aug. 1976-pp. 479–496.

"Light Valves Using DKDP Operated Near Its Curie Point: Titus and Phototitus", Marie, Ferroelectrics, 1976, vol. 10, pp. 9–14.

"A Construction of Liquid Crystal Light Valve in a Reflection Mode", Yoshikawa et al., Journal of the Institute of Electronics and Communication, Engineers of Japan, vol. J59-C, No. 5 (1976) pp. 305-312.

"Full-Color Single-Projection-Lens Liquid-Crystal Light Valve Projector", Ledebuhr, SID 86 Digest (1986) pp. 379-382.

"A 1075-Line Video-Rate Laser-Addressed Liquid-Crystal Light-Valve Projection Display" Trias et al. SID 88 Digest (1988) pp. 99-101.

"Multi-Colour Laser-Addressed Liquid Crystal Projection Display", Mori et al. Displays, Apr. 1988, pp. 51-55.

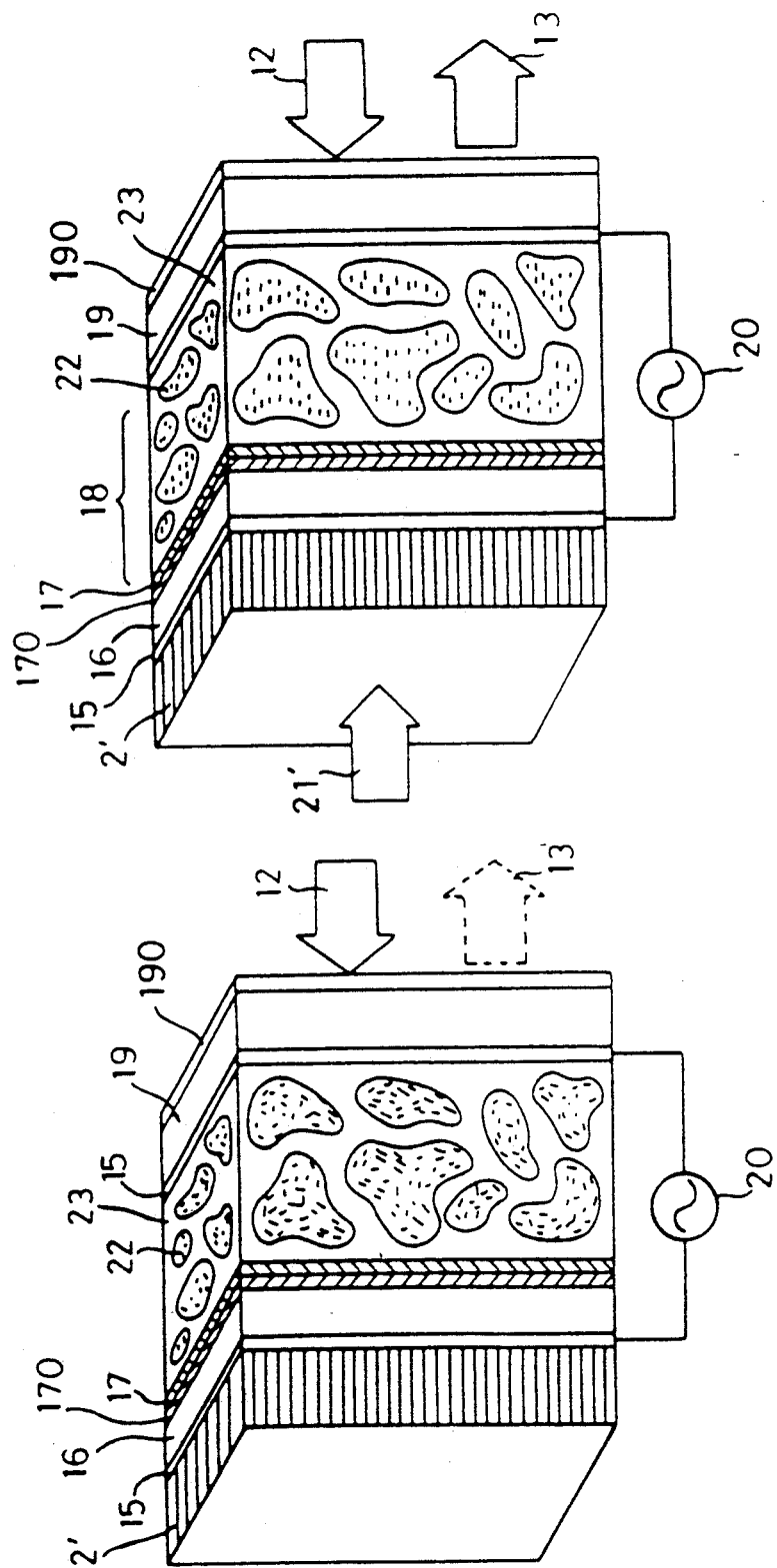

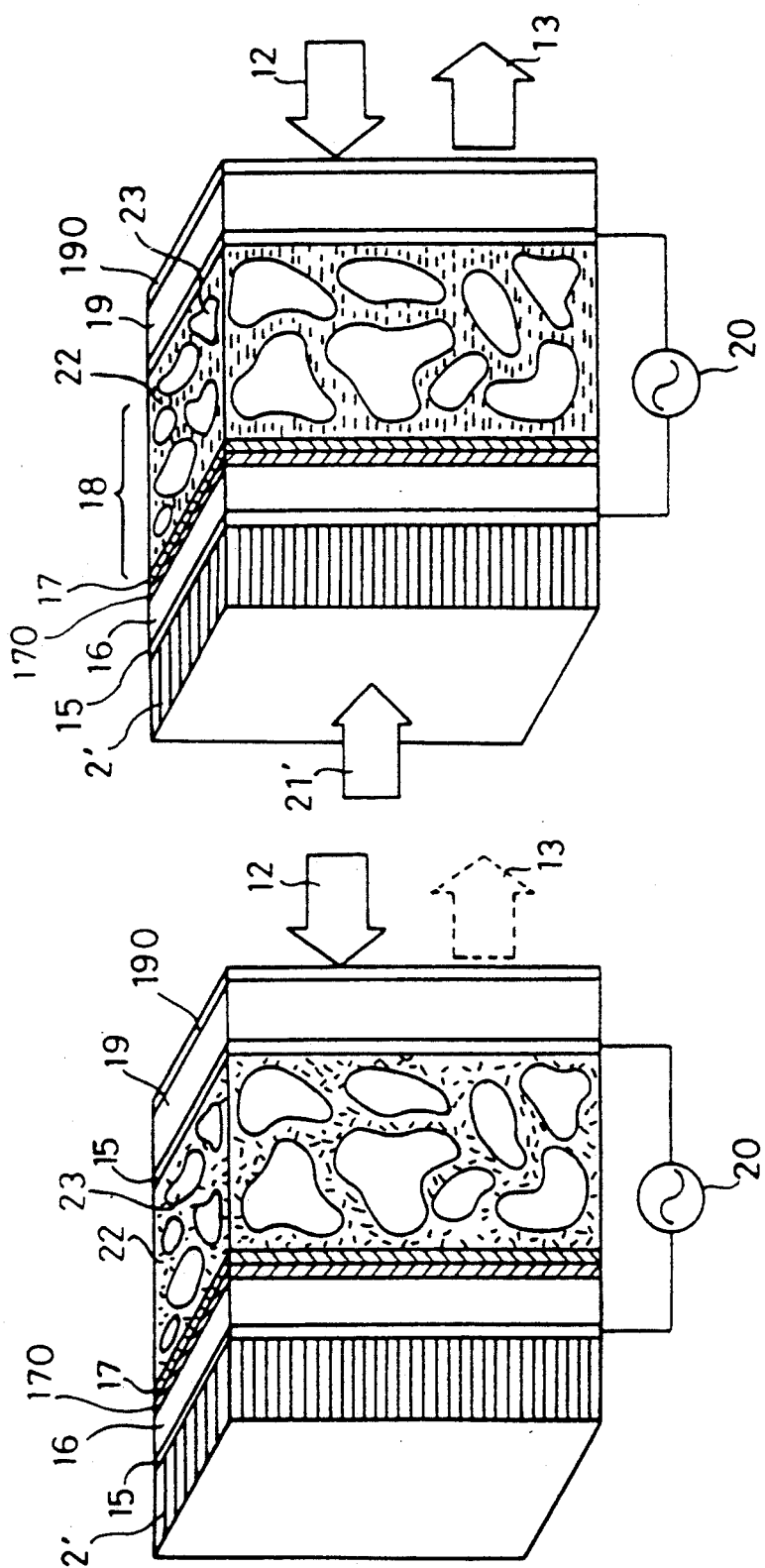

LIGHT WRITING TYPE PROJECTION DISPLAY USING POLYMER-DISPERSED LIQUID CRYSTAL AND LIQUID CRYSTAL TELEVISION SET AS IMAGE LIGHT SOURCE

This application is a continuation-in-part of application Ser. No. 07/655,379 filed Mar. 5, 1991, now abandoned.

TECHNICAL FIELD

The present invention relates to a light writing type projection display, and more particularly to a light writing type projection display which has the function of applying two-dimensional information, such as images or data patterns, to a spatial light modulator by using a write light beam, and displaying the information in two-dimensional form by using a display light beam.

BACKGROUND ART

As conventional light writing type projection displays, the following apparatuses are known. (1) REFERENCE I (G. Marie: Ferroelectrics, 1976, Vol. 10, pp. 9–14) discloses a light writing type projection display as shown in FIG. 8 hereof. It is arranged such that a DKDP (KD2PO4) crystal 251, a CaF$_2$ holder 261, a dielectric mirror 17, a photoconductive layer 16, a pair of transparent electrodes 15 and Peltier cells 27 are sealed in a vacuum vessel 241. In FIG. 8, reference numeral 6 designates a pair of lenses, 28, a polarizing beam splitter, 29, a light source for display, 30, an object used as an input image, 291, a light source for illuminating the object, 31, an input light beam, 12, display light beam, 13, projected light beam, 33, a power source for driving the DKDP crystal 251 and the photoconductive layer 16, and 34, a switch.

In the described arrangement, the input light beam 31 emitted from the light source 291 such as an xenon lamp or halogen lamp for illumination, reaches the photoconductive layer 16 through the lens 6 and the transparent electrode 15. The photoconductive layer 16 changes its resistivity spatially in accordance with the intensity of the input image. Accordingly, the electric field distribution applied to the DKDP crystal 251 can undergo a spatial change when the driving power source 33 connected to the pair of transparent electrodes 15 is turned on and off by the switch 34. During this process, an applied electric field is converted into a spatial distribution of refractive indices of the DKDP crystal by the electrooptic effect thereof. On the other hand, the display light beam 12 emitted from the display light source 29 is polarized by the polarizing beam splitter 28, passes through the lens 6, the CaF2 holder 261 in the vacuum vessel 241, and the transparent electrode 15, illuminates the DKDP crystal 251, and is reflected on the dielectric mirror 17. After that, it is transmitted along the path in the opposite direction, passes the polarizing beam splitter 28, and is projected on a screen (not shown) as the projected light beam 13. (2) REFERENCE 2 (Shigeru Yoshikawa, Masakatsu Horie, Hideo Takahashi, and Takaki Shimura: Journal of the Institute of Electronics and Communication Engineers of Japan, Vol. J59-C, No. 5 (1976) pp. 305–312) discloses a projection type display as shown in FIG. 9. It has a dynamic scattering mode type nematic liquid crystal light valve 35 adhered to a cathode ray tube 3 with a fiber optic faceplate. In FIG. 9, reference numeral 36 designates a signal generator, 37, a power source for driving the liquid crystal light valve 35, 29, a light source, 6, lenses, 8, an ultraviolet light cut filter, 9, a mirror, 12, a display light beam incident on the liquid crystal light valve 35, 13, a projected light beam, and 14, a screen. In this described arrangement, the light beam emitted from the light source 29 passes through the lenses 6, the ultraviolet light cut filter 8, and is reflected on the mirror 9 to form the display light beam 12. Subsequently, it passes through the lens 6 and reaches the liquid crystal light valve 35. The projected light beam 13 emitted from the liquid crystal light valve 35 passes through the lens 6, and is projected onto the screen 14, thus being displayed as an image.

The dynamic scattering mode type nematic liquid crystal light valve 35 is arranged in such a manner that the following elements are integrally laminated in sequence as shown in FIG. 10: a transparent electrode 15 which is adhered to the fiber optic faceplate 2 of the cathode ray tube 3; a semitransparent electrode 38; an SeTe photoconductive layer 39; a wire plate 40; a spacer 41; nematic liquid crystals 42; a transparent electrode 15; and a glass substrate 19.

(3) REFERENCE 3 (A. G. Ledebuhr: SID 86 Digest (1986) pp. 379–382) discloses a projection type display as shown in FIG. 11. It has three cathode ray tubes 3 each having a fiber optic faceplate 2 and a liquid crystal light valve 43 that is adhered to a respective fiber optic face plate 2, two polarizing beam splitters 44, and two dichroic filters 45. In FIG. 11, reference numeral 11 designates input wires for feeding electric signals to the cathode ray tubes 3, 47, a light source, 48, a display light beam emitted from the light source 47, 46, a transparent plate for compensating the optical path length of the blue light, 49, an aperture, and 50, a projected light beam modulated by the three twisted nematic liquid crystal light valves 43.

In this arrangement, the display light beam 48 emitted from the light source 47 passes the mirror 9, the aperture 49, the mirror 9, and the lenses 6, thus reaching the pair of polarizing beam splitters 44, 44. Then the beam passes the mirrors 9 and the lenses 6, and is split into three beams by the pair of dichroic filters 45. The three beams enter the three twisted nematic liquid crystal light values 43. In addition, the three light beams modulated by the three twisted nematic liquid crystal light valves 43 are coupled into one light beam by the pair of dichroic filters 45, and it passes the lens 6, the mirror 9, the polarizing beam splitter 44, the aperture 49, the mirror 9, the lens 6, and the mirror 9, and is projected to a screen not shown in this figure as the projected light beam 50. Thus, an image is displayed.

Each liquid crystal light valve 43 is arranged by laminating the following elements into a unit as shown in FIG. 12: an alignment layer 51, a nematic liquid crystal layer 52, an alignment layer 51, a dielectric multilayer mirror 53, a light absorption layer 54, a CdS photoconductive layer 55, and transparent electrodes 15 attached to both ends of the laminated layers. In FIG. 12, reference numeral 41 denotes a spacer in which the nematic liquid crystals are retained by a peripheral seal, 20, an alternating-current power supply connected to the transparent electrodes 15, 19, glass plates which are attached to the outer side of each transparent electrode 15, 31, an input light beam, 12, a display light beam incident on the liquid crystal light valve 43, and 13, a projected light beam.

(4) REFERENCE 4 (J. Trias, W. Robinson, and T. Phillips: SID 88 Digest (1988) pp. 99–101) discloses a projection type display as shown in FIG. 13. In this display, a write light beam 57 emitted from an argon ion laser 56 is incident on a twisted nematic liquid crystal light valve 43 through a laser raster scanner 58. On the other hand, a display beam 12 emitted from a xenon light source 4 is incident on the other surface of the liquid crystal light valve 43 through a polarizing beam splitter 44, and the reflected light beam thereon, namely, the projected light beam 13 is projected onto a screen (not shown in this figure) through a projection lens 6, thus displaying an image. In FIG. 13, reference numeral 59 designates an input electric signal, and 60, laser raster scanner electronics for driving the laser raster scanner 58 in accordance with the input electric signal 59. (5) REFERENCE 5 (Y. Mori, Y. Nagae, E. Kaneko, H. Kawakami, T. Hashimoto and H. Shiraishi: Displays April (1988) pp. 51–55) discloses a projection type display as shown in FIG. 14. In this figure, a write light beams 62 emitted from laser diodes 61 are incident on smectic liquid crystal light valves 65 through an X-Y scanner 64. On the other hand, display beams 12 emitted from xenon light sources 4 are incident on the other surfaces of liquid crystal light valves 65 through dichroic prisms 66, and the reflected beams on the valves are projected onto a screen 14 through a projection lenses 67. In FIG. 14, reference numeral 68 designates a liquid crystal light valve drive circuit, 66', wavelength filters, 69, a f-θ lens, 63, a collimating lens, 70, a polarizing prism, 71, a beam splitter, 72, an X-Y scanner drive circuit, 73, a system control circuit, and 74, a laser diode drive circuit.

The smectic liquid crystal light valve 65 is arranged by laminating the following elements in sequence as shown in FIG. 15: a transparent electrode 15, an alignment layer 51, a smectic liquid crystal layer 75, an alignment layer 51, a metal mirror 76, a heat sinking layer 77, glass substrates 19 provided on both sides of the layer unit, and antireflection films attached to the outer surfaces of the glass substrates 19.

The conventional light writing type projection displays described above have the following disadvantages.

(1) The projection type display of REFERENCE 1, which is described in (1) above and is shown in FIG. 8, uses the electrooptic effect of the DKDP crystal 251, resulting in the following:

(1-1) It necessitates a polarizer and an analyzer such as polarizing beam splitter 28. This reduces the availability of the display light beam to less than 50%.

(1-2) The broad spectral width of the display light beam 12 will reduce the contrast ratio of the image.

(1-3) As the DKDP crystal 251 is made thinner, the resolution will be improved. This, however, is difficult beyond a certain limit because a bulk single crystal cannot be thinned beyond a certain thickness by polishing (about 100 μm thick by current technique).

(1-4) It is difficult to obtain a DKDP crystal having a large area.

(1-5) It is difficult to display a high definition image because of the reasons described in (1-3) and (1-4).

(1-6) The Peltier cells 27 must be used to cool the DKDP crystal 251 to about −50° C. This makes the arrangement complicated.

(1-7) The drive voltage is large.

Accordingly, the display of REFERENCE I is unsuitable for displaying a high resolution image.

(2) The projection type display of REFERENCE 2 which is described in (2) above, and is shown in FIGS. 9 and 10 presents the following problems because dynamic scattering mode type nematic liquid crystals are used as the light valve 35.

(2-1) The speed of response of the liquid crystals is very slow.

(2-2) The power consumption of the liquid crystals is large, and the life of the liquid crystals is short because the liquid crystals are subjected to current drive.

(2-3) It has disadvantages such as a low contrast ratio of the displayed image. Accordingly, the display of REFERENCE 2 is unsuitable for displaying motion images.

(2-4) In addition, it uses the wire plate 40, which reduces the resolution.

(3) The projection type display of REFERENCE 3 which is described in (3) above, and is shown in FIGS. 11 and 12 has the following problems because the liquid crystal light valve 43 uses the birefringence of the twisted nematic liquid crystals.

(3-1) The display has problems similar to those of (1-1), (1-3) and (1-4) with regard to the display described in (1).

(3-2) In addition, the variation of thickness of the liquid crystal layer must be restricted within about ±50 nm over the entire layer. This makes it extremely difficult to fabricate a liquid crystal light valve having a large area and of high, uniform quality.

(3-3) The speed of response of the liquid crystals and CdS photoconductive layer is slow.

Accordingly, the display of REFERENCE 3 is unsuitable for displaying a high resolution motion image.

(4) The projection type display of REFERENCE 4 which is described in (4) above, and is shown in FIG. 13 has the following problems because it uses the liquid crystal light valve 43 like that used in the display of (3) above.

(4-1) The display has problems similar to those of (3-1), (3-2) and (3-3) with regard to the display described in (3).

(4-2) In addition, the write light source 56 and the beam splitter 44 become more complicated.

(4-3) The laser raster scanner 58 makes the write light beam 57 perform two dimensional scanning by using a traveling-wave lens using the accoustooptic effect. This produces higher order diffraction light around a condensing spot, decreasing the resolution.

Accordingly, the display of REFERENCE 4 is unsuitable for displaying high resolution motion images.

(5) The projection type display of REFERENCE 5 which is described in (5) above, and shown in FIGS. 14 and 15 operates on the following principle: it makes the write light beams 62 scan the smectic liquid crystal light valves 65; converts the smectic liquid crystals retained in the liquid crystal light valves 65 from the homogeneous state to the scattered state by using the thermal energy of the write light beams 62; and transmits or scatters the display light beams 12. This poses the following problems.

(5-1) Although the resolution is high, the speed of response is very slow. For example, it takes tens of seconds or about a minute to display a piece of a still image.

(5-2) It is difficult to display a gray scale image, that is, it is difficult to achieve full-color display.

(5-3) The beam scanner 64 must perform high precision scanning.

Accordingly, the display of REFERENCE 5 is unsuitable for displaying motion pictures.

SUMMARY OF THE INVENTION

Accordingly, an object of the present invention is to provide a light writing type projection display which can solve the above-mentioned various problems. Specifically, it is an object of the invention to provide a display that can display high quality, bright images or data patterns, that can convert optical wavelength, that can quickly convert incoherent optical images into coherent optical images, or vice versa, and that is suitable for displaying high definition motion images on a large screen.

To accomplish this object, the present invention is provided with a light writing type projection display comprising:

a spatial light modulator comprising:
  an antireflection film;
  a glass substrate;
  a liquid crystal composition including
    a liquid crystal from the group consisting of nematic liquid crystals, choresteric liquid crystals, and smectic liquid crystals; and
    a transparent resin matrix, said liquid crystal composition comprising one of said liquid crystals enclosed and scattered within said resin matrix, and said resin matrix enclosed and scattered in said liquid crystals;
  a dielectric multilayer film mirror, said film mirror totally reflecting light having wavelengths in at least part of the visible spectra;
  an insulating light absorption layer, said light absorption layer absorbing the light beam transmitted through said dielectric multilayer film mirror; and
  a photoconductive layer, a transparent electrode, and a fiber optical plate, said photoconductive layer, transparent electrode and fiber optic plate being laminated in the recited sequence, said resin matrix having a refractive index equal to or approximately equal to one of the ordinary or extraordinary refractive index of the liquid crystals, and the refractive index of the liquid crystals which are randomly oriented;
converting means comprising a display device, said display device converting an input image signal into an optical image having spectra to which said photoconductive layer responds, said optical image thereby illuminating the photoconductive layer of said spatial light modulator;
illumination means including a visual light source emitting white light, said illumination means directing said white light to said spatial light modulator as a display light beam; and
an image formation optical system comprising
  a lens; and
  an aperture, a projected light beam reflected from said spatial modulator passing through said lens and aperture thereby forming an image, the optical path of the projected light beam differing from the optical path of the display light beam incident on said spatial light modulator when an electric field is applied to the spatial light modulator.

Here, the display device may be a cathode ray tube.

The cathode ray tube may have a fiber optic faceplate as its image display screen, the fiber optic faceplate being attached to the spatial light modulator via a transparent liquid layer. The refractive index of the liquid layer is substantially the same as that of the fiber optic faceplate.

The display device may be a liquid crystal television set which is illuminated by a light beam having spectra to which the photoconductive layer of the spatial light modulator responds. A light beam transmitted through the liquid crystal television set is incident on the photoconductive layer.

The display may have a schlieren optical system in which the optical path of the display light beam incident on the spatial light modulator differs from the optical path of the projected light beam reflected by the dielectric multilayer film mirror in the spatial light modulator when an electric field is applied to the spatial light modulator.

The liquid crystals may be one of the nematic liquid crystals, cholesteric liquid crystals, and smectic liquid crystals.

According to another aspect of the present invention, there is provided a light writing type projection display comprising:

first, second, and third spatial light modulators, each of said light modulators comprising:
  an antireflection film;
  a glass substrate;
  a liquid crystal composition including
    a liquid crystal from the group consisting of nematic liquid crystals, choresteric liquid crystals, and smectic liquid crystals; and
    a transparent resin matrix, said liquid crystal composition comprising one of said liquid crystals enclosed and scattered within said resin matrix, and said resin matrix enclosed and scattered in said liquid crystals;
  a dielectric multilayer film mirror, said film mirror totally reflecting light having wavelengths in at least part of the visible spectra;
  an insulating light absorption layer, said light absorption layer absorbing the light beam transmitted through said dielectric multilayer film mirror;
  a photoconductive layer, a transparent electrode, and a fiber optical plate, said photoconductive layer, transparent electrode and fiber optic plate being laminated in the recited sequence, said resin matrix having a refractive index equal to or approximately equal to one of the ordinary or extraordinary refractive index of the liquid crystals, and the refractive index of the liquid crystals which are randomly oriented;
converting means having first, second, and third display devices, said display devices converting blue, green, and red input image signals into optical images each having spectra to which said photoconductive layer responds, said optical image thereby illuminating the photoconductive layers of said first, second and third spatial light modulators;
optical means comprising
  a visual light source emitting white light; and
  means for separating said white light into a first light beam having wavelengths in the blue region, a second light beam having wavelengths in the green region, and a third light beam having wavelengths in the red region;
illumination means, said illumination means directing said first, second and third light beams onto said first, second and third spatial light modulators, respectively, as display light beams; and
an image formation optical system comprising a lens; and an aperture, projected light beams reflected from said first, second and third spatial modulators passing through said lens and aperture thereby forming an image, the optical path of the projected light beams differing from the optical path of the display light beams incident on said first, second and third spatial light modulator when an electric field is applied to the first, second and third spatial light modulators, whereby a full-color image is displayed.

Here, the first, second and third display devices may be cathode ray tubes.

The cathode ray tubes may have fiber optic faceplates as their image display screens, the fiber optic faceplates being attached to the first, second and third spatial light modulators via transparent liquid layers. The refractive index of the liquid layers is substantially the same as that of the fiber optic faceplates.

The first, second and third display devices may be liquid crystal television sets which are illuminated by light beams having spectra to which the photoconductive layers of the first, second and third spatial light modulators respond. Light beams transmitted through the liquid crystal television sets are incident on the respective photoconductive layers.

The display may have a schlieren optical system in which the optical paths of the display light beams incident on the first, second and third spatial light modulators differ from the optical paths of the projected light beams reflected by the dielectric multilayer film mirrors in the first, second and third spatial light modulators when electric fields are applied to the first, second and third spatial light modulators.

The liquid crystals may be one of the nematic liquid crystals, cholesteric liquid crystals, and smectic liquid crystals.

The present invention, having arrangements mentioned above, can display high quality, bright images or data patterns, and can convert optical wavelengths, in particular. It can quickly convert incoherent optical images into coherent optical images, or vice versa, and is suitable for displaying high definition motion images on a large screen. More specifically:

(A) The speed of response of the liquid crystal composition constituting the present invention is from milliseconds to tens of milliseconds, which is faster than those of dynamic scattering mode type liquid crystals or of twisted nematic liquid crystals. As a result, the projection type display of the present invention has a faster speed of response than conventional projection type displays previously described in (1)–(5) above, and so is more suitable for displaying motion images.

(B) The projection type display of the present invention can display images without using a polarizer and/or an analyzer because it uses the light scattering characteristic of the liquid crystal composition. Accordingly, the present invention can achieve bright display images with high spatial uniformity and a high contrast ratio. In addition, the present invention can solve the disadvantages of the conventional projection type displays. Specifically, the disadvantages of the display described in (1) such as low availability of the display light beam, need for a high crystal polishing technique, reduction in contrast ratio, and need for high parallelism of the display light beam. The disadvantages of the display described in (3) such as low availability of the display light beam, difficulty in achieving a large area; and the disadvantages of the display described in (4) such as low availability of the display light beam and complication of the write light beam light source are overcome.

(C) The spatial light modulator of the present invention does not require alignment of the liquid crystal layers which is essential for the liquid crystal light valves of the conventional projection type displays described in (1), (3) and (4) above. Thus, the liquid crystal layer of the present invention is not arranged in such a manner that a liquid crystal layer in the liquid state is sandwiched between the substrates. This makes it possible to enlarge the display screen, and greatly facilitates the fabrication of the device.

(D) The liquid crystal composition of the present invention can be greatly enlarged in comparison with conventional liquid crystal cells that retain the liquid crystals in the liquid state between substrates with a peripheral seal (see FIGS. 10 and 12). In addition, the spatial light modulator of the liquid crystal composition can be easily enlarged by using an amorphous silicon film, for example, as a photoconductive layer. Thus, size matching with a conventional cathode ray tube can be carried out more easily.

(E) The electro-optic characteristics (optical transmittance T versus applied voltage V) of the liquid crystal composition has a smaller $q(=dT/dV)$ value than that of the twisted nematic liquid crystals or the ferroelectric liquid crystals. This facilitates displaying analog images. Consequently, it is suitable for analog display.

(F) Using a liquid crystal television set in place of the cathode ray tube television set makes it possible to arrange a compact projection type display.

(G) The present invention has an advantage that it can display motion images by using a schlieren optical system.

The above and other objects, effects, features and advantages of the present invention will become more apparent from the following description of embodiments thereof taken in conjunction with accompanying drawings.

BRIEF DESCRIPTION OF THE DRAWINGS

FIGS. 3A, 3B, 3C and 3D are perspective views illustrating the operation of the liquid crystal composition that constitutes the spatial light modulator of FIG. 2;

DESCRIPTION OF THE PREFERRED EMBODIMENTS

Embodiments of the present invention will be described with reference to the drawings.

Figure 1:
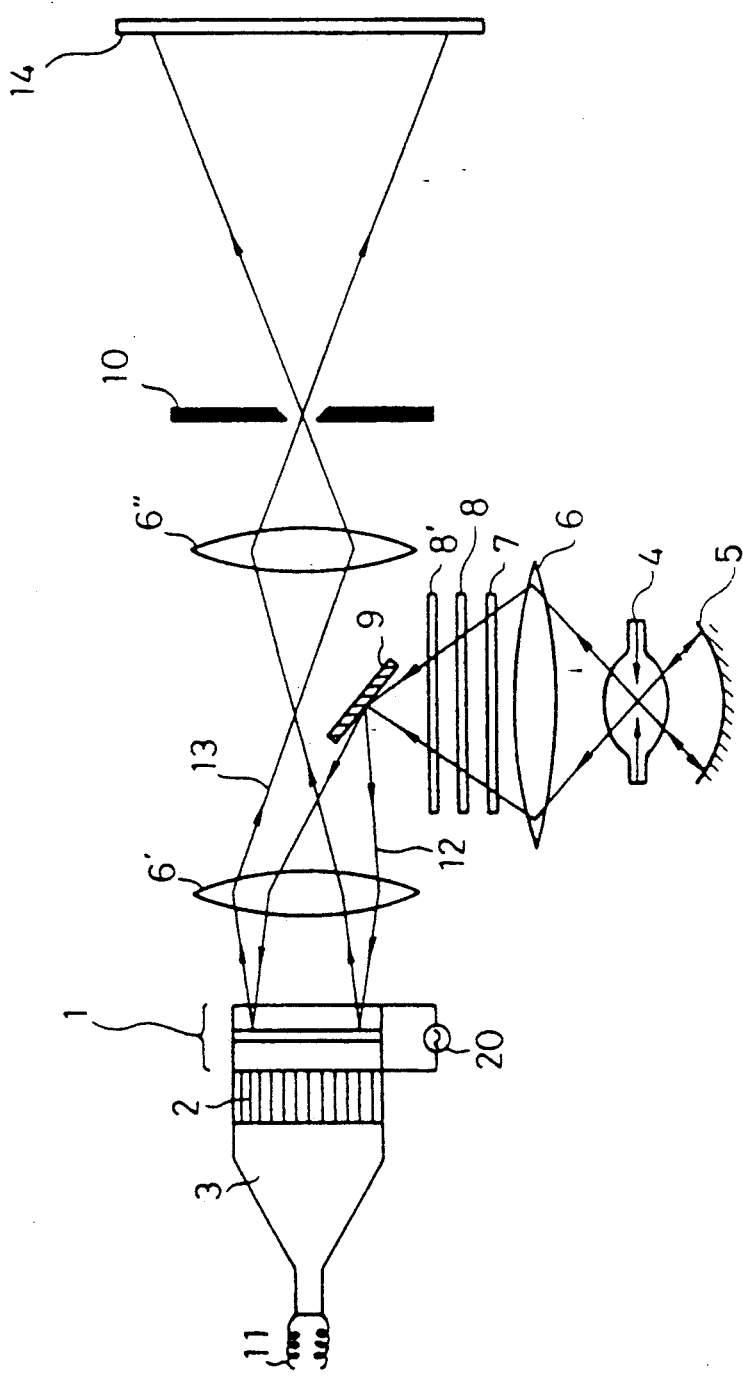
FIG. 1 is a schematic diagram showing an example of the arrangement of the light writing type projection display of the present invention.

FIG. 1 shows schematically an arrangement of an embodiment of a light writing type projection display according to the present invention. In FIG. 1, reference numeral 1 designates a spatial light modulator which will be described in more detail with reference to FIG. 2, 2, a fiber optic faceplate, 3, a cathode ray tube. The image display glass faceplate of the cathode ray tube 3 is replaced by the fiber optic faceplate 2, and the spatial light modulator 1 is adhered to the fiber optic faceplate 2 via a transparent liquid layer. The cathode ray tube 3 converts an electric signal fed through input wires 11 into an optical image, the spectrum of which activates a photoconductive layer in the spatial light modulator 1.

Reference numeral 4 designates a display beam light source that operates as a visible light source by emitting white light. As the light source 4, a lamp such as a xenon lamp, halogen lamp or metal hydride lamp can be used. The white light emitted from the display beam light source 4 that has a concave mirror 5 passes a collecting lens 6, infrared cut filter 7, ultraviolet cut filter 8, and color filter 8', is reflected by a mirror 9 to change the path, passes a lens 6', and is incident onto the spatial light modulator 1. The lenses 6' and 6'', and an aperture 10 constitute an image formation optical system through which a projected light beam 13 reflected from the spatial light modulator 1 passes. The projected light beam 13 is then projected on a screen 14, thereby displaying an image. The spatial light modulator 1 is driven by an alternating-current power supply 20.

Figure 2:
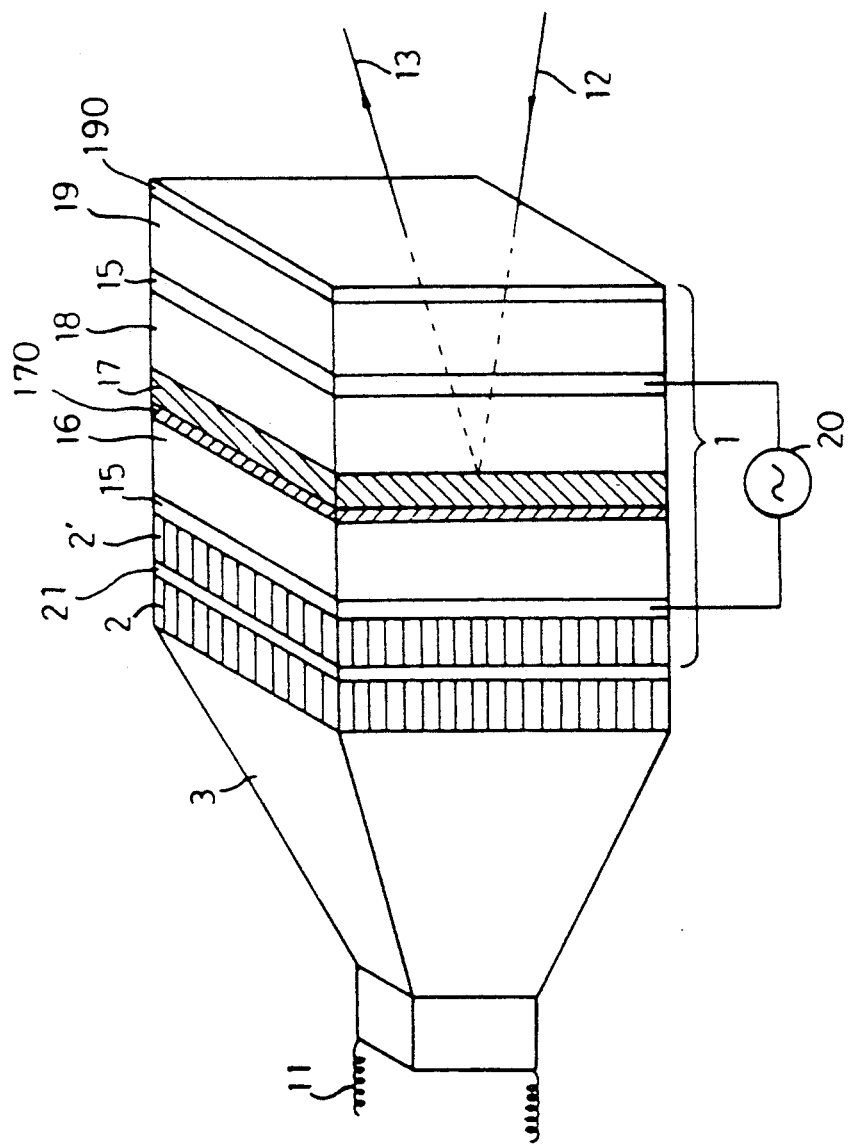
FIG. 2 is a perspective view showing an example of the arrangement of the spatial light modulator that constitutes the arrangement of FIG. 1.

FIG. 2 shows an example of the arrangement of the spatial light modulator 1 of the embodiment shown in FIG. 1. As shown in FIG. 2, the spatial light modulator 1 is arranged by unitarily laminating the following elements in sequence: an antireflection layer or film 190; a glass substrate 19; a transparent electrode 15; a liquid crystal composition 18; a dielectric multilayer film mirror 17 that totally reflects the entire or a part of the visible spectra; an insulating light absorption layer 170 that absorbs the light beam transmitted through the dielectric multilayer film mirror 17; a photoconductive layer 16, a transparent electrode 15; and a fiber optic plate 2'. The alternating current power supply 20 is connected to the two transparent electrodes 15. In addition, between the fiber optic plate 2' and the fiber optic faceplace 2, is inserted a transparent liquid layer 21, the refractive index of which is equal or approximately equal to that of the fiber optic plate 2.

The fiber optic faceplate 2 is integrally constructed with the cathode ray tube: one surface of the fiber optic faceplate 2 is in the cathode ray tube, whereas the other surface thereof is in contact with the liquid layer 21.

The liquid crystal composition 18 used in the present invention comprises liquid crystals 22 and a resin matrix 23 as shown in FIGS. 3A, 3B, 3C and 3D: the liquid crystals 22 consist of nematic liquid crystals, cholesteric liquid crystals, or smectic liquid crystals; the resin matrix 23 is made of a transparent resin which has a refractive index equal to or approximately equal to the ordinary or extraordinary refractive index of the liquid crystals, or to the refractive index when the liquid crystals are oriented in random directions; and the liquid crystals 22 are enclosed and scattered in the resin matrix 23.

More specifically, the liquid crystal composition 18 of the present invention takes a form of one of the following three types: first, the complex 18 has the liquid crystals 22 which are enclosed and scattered in the resin matrix 23, the liquid crystals 22 being scattered taking various forms (the lengths of which are from hundreds of nanometers to a few tens of micrometers) as shown in FIGS. 3A and 3B, for example; second, the complex 18 has the liquid crystals 22 which are enclosed in the resin matrix 23 in a micro-capsule-like shape; and third, the complex 18 has the resin matrix 23 which is enclosed and scattered in the liquid crystals 22 as shown in FIGS. 3C and 3D, for example.

The liquid crystal composition 18 of such an arrangement, controls the light beam as follows: When the ordinary or extraordinary refractive index of the liquid crystals 22 is equal to or approximately equal to that of the resin matrix 23, and the electric field is not applied to the liquid crystal composition 18, the complex 18 is in the scattered state in which the light beam is scattered because the refractive indices of the liquid crystals 22 and the resin matrix 23 are different. On the other hand, when the electric field is applied to the liquid crystal composition 18, the complex 18 is in the transparent state in which the light beam is transmitted because the refractive indices of the liquid crystals 22 and the resin matrix 23 are equal or approximately equal. Alternatively, when the refractive index of the randomly oriented liquid crystals 22 is equal to or approximately equal to that of the resin matrix 23, the liquid crystal composition 18 is in the transparent state because the refractive index of the liquid crystals 22 and that of the resin matrix are equal or approximately equal when the electric field is not applied. On the other hand, when the electric field is applied to the liquid crystal composition 18, the index of the liquid crystals 22 and that of the resin matrix 23 are different, and so the complex 18 is in the scattered state. Although either type of the liquid crystal composition 18 can be used in the present invention, the former type in which the ordinary or extraordinary refractive index of the liquid crystals 22 is equal to or approximately equal to that of the resin matrix 23 is preferable. In particular, the type in which the ordinary refractive index of the liquid crystals 22 is equal to or approximately equal to that of the resin matrix 23 is optimal in its performance.

The photoconductive layer 16 of the present invention as shown in FIGS. 2, 3A, 3B, 3C and 3D is made of a material that sharply decreases its impedance with illumination, such as CdS, CsSe, Se, SeTe, GaAs, GaP, $Bi_{12}SiO_{20}$, $Bi_{12}GeO_{20}$, Si, hydrogen-doped amorphous silicon film and amorphous selenium film. Assuming that the impedances of the photoconductive layer 16 when illuminated and not illuminated by the write light beam are $Z_{on}$ and $Z_{off}$ respectively, and that the impedance of the liquid crystal composition 18 is $Z_{lc}$, and that the combined impedance of the dielectric multilayer film mirror 17 and the light absorption layer 170 is $Z_m$, the spatial light modulator 1 has the relationship expressed by the following equation (1).

$$Z_{off} > Z_{lc} \geqq Z_{on} \tag{1}$$

When the thickness and the dielectric constant of the photoconductive layer 16 are specified as $t_1$ and $e_1$, and the thickness and the dielectric constant of the liquid crystal composition 18 are defined as $t_2$ and $e_2$, the spatial light modulator 1 of the present invention has the relationship expressed by the following equation (2).

$$t_1/e_1 >> t_2/e_2 \tag{2}$$

Next, the operation of the light writing type projection display of the present invention will be described for the case wherein the spatial light modulator 1 uses a liquid crystal composition 18 of the type in which the ordinary refractive index of the liquid crystals 22 is equal to or approximately equal to that of the resin matrix 23.

When the electric signal applied through the input wires 11 in FIG. 1 is zero, the emission intensity of the cathode ray tube 3 is also zero. As a result, almost all the voltage applied to the spatial light modulator 1 is applied to the photoconductive layer 16 according to equation (1), and so the voltage applied to the liquid crystal composition 18 is small. Consequently, the molecules of the liquid crystals 22 face various directions in conformity with the irregular surfaces of the resin matrix 23 as shown in FIGS. 3A and 3C. In this case, the liquid crystals 22 have a refractive index which is different from the refractive index ($n_p$) of the resin matrix 23 surrounding the liquid crystals 22. Thus, the display light beam 12 is scattered in the liquid crystal composition 18 so that the projected light beam 13 takes the smallest intensity.

As the electric signal applied through the input wires 11 increases, the fluorescence 21' on the screen of the cathode ray tube 3 increases in accordance with the level of the electric signal. The fluorescence 21' illuminates the photoconductive layer 16 through the fiber optic faceplate 2 and the fiber optic plate 2', thus decreasing the impedance of the photoconductive layer 16 so that the voltage applied to the liquid crystal composition 18 increases. When the level of the electric signal applied to the input wires 11 is sufficiently large, the longitudinal axes of the liquid crystal molecules of the liquid crystal composition 18 align in the direction of the applied electric field as shown in FIGS. 3B and 3D. Thus, the display light beam 12 incident approximately normally on the liquid crystal composition 18 passes the liquid crystals 22 without scattering, because the ordinary refractive index $n_o$ of the liquid crystals 22 is approximately equal to the refractive index $n_p$ of the resin matrix 23. Consequently, the projected light beam 13 is reflected by the dielectric multilayer film mirror 17 and takes the maximum intensity.

In this case, the image projected on the screen 14 is a brightened and enlarged image of the original optical image emitted from the cathode ray tube 3. The spectra of the image projected on the screen 14 can be optionally selected by the color filter 8'. The contrast ratio and brightness of the image projected on the screen 14 can be adjusted by the aperture 10 functioning as a field stop: when the opening of the aperture 10 is made larger, the brightness of the projected image on the screen 14 increases, whereas the contrast ration thereof decreases; in contrast with this, when the opening of the aperture 10 is made smaller, the contrast of the projected image on the screen 14 is improved, whereas the brightness decreases.

Figure 4:
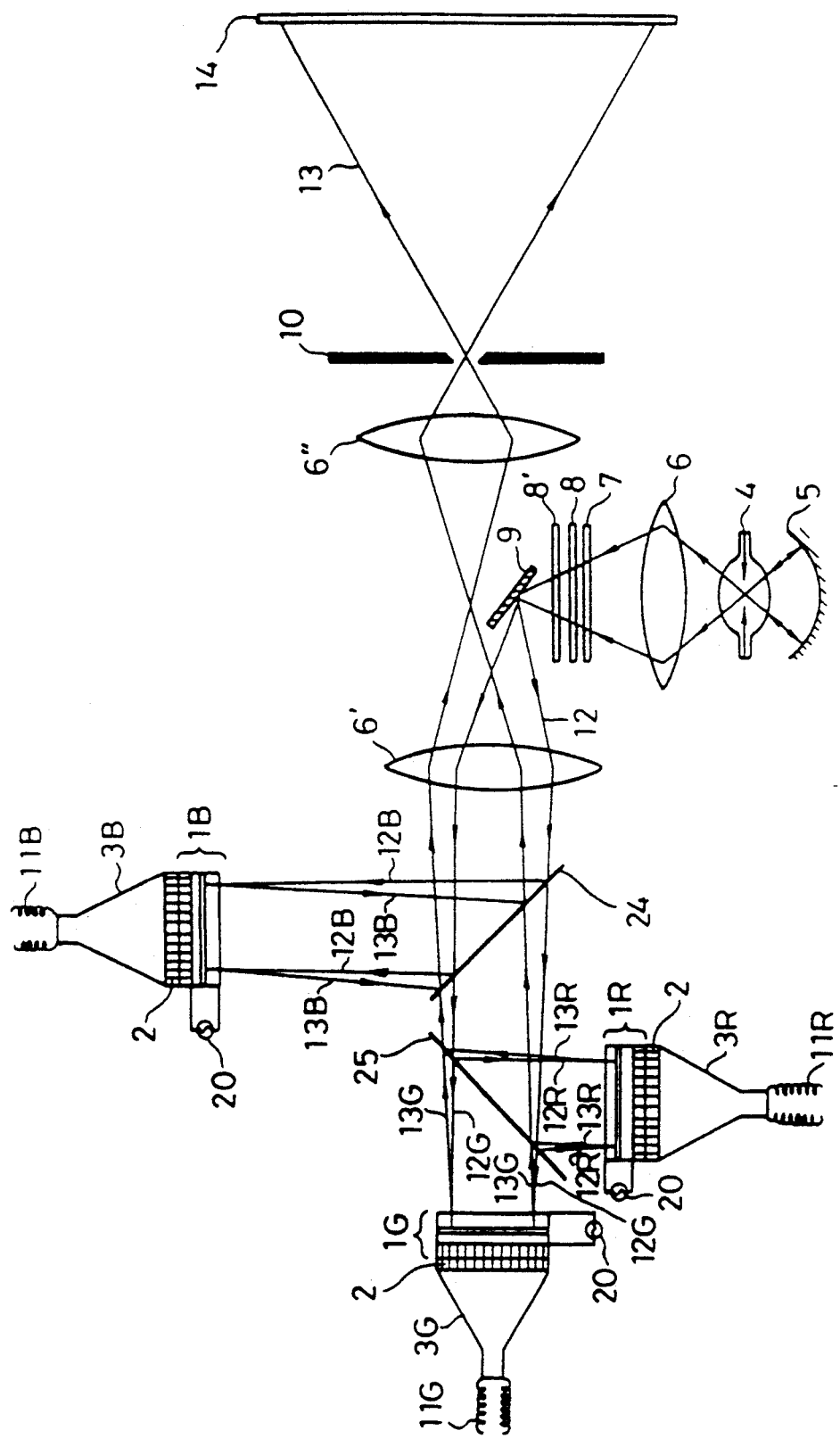
FIGS. 4–6, 7A and 7B are schematic diagrams showing other examples of the arrangement of light writing type projection display of the present invention.

FIG. 4 shows another arrangement of the light writing type projection display of the present invention. The display of FIG. 4 is a full-color projection type display arranged by using three sets of the basic arrangement, each of which has a configuration including a cathode ray tube as shown in FIG. 1. In FIG. 4, reference numeral 24 designates a dichroic mirror that reflects a part of the light beam 12 and transmits the other part of the light beam 12, the reflected part of the light beam 12 having the spectrum of blue or near blue light 12B (called the blue light beam 12B hereinafter) of the white light 12 emitted from the visual light source 4. Reference numeral 25 designates a dichroic mirror that reflects a part of the visible light that passes the dichroic mirror 24 and reflects the other part thereof, the transmitted part of the light beam having the spectrum of green or near green light 12G (called the green light beam 12G hereinafter), and the other reflected part of the light beam having the spectrum of red or near red light 12R (called the red light beam 12R hereinafter).

In FIG. 4, reference numerals 1B and 3B designate a spatial light modulator and a cathode ray tube that respond to the blue light beam 12B, and convert the blue light beam 12B into the projected light beam 13B by modulating the blue light beam 12B. Reference numerals 1R and 3R designate a spatial light modulator and a cathode ray tube that respond to the red light beam 12R, and convert the red light beam 12R into the projected light beam 13R by modulating the red light beam 12R. Reference numerals 1G and 3G designate a spatial light modulator and a cathode ray tube that respond to the green light beam 12G, and convert the green light beam 12G into the projected light beam 13G by modulating the green light beam 12G. The respective projected light beams 13B, 13R and 13G are coupled to the projected light beam 13 by the dichroic mirrors 24 and 25, and the light beam 13 is projected onto the screen 14 to be displayed.

Figure 5:
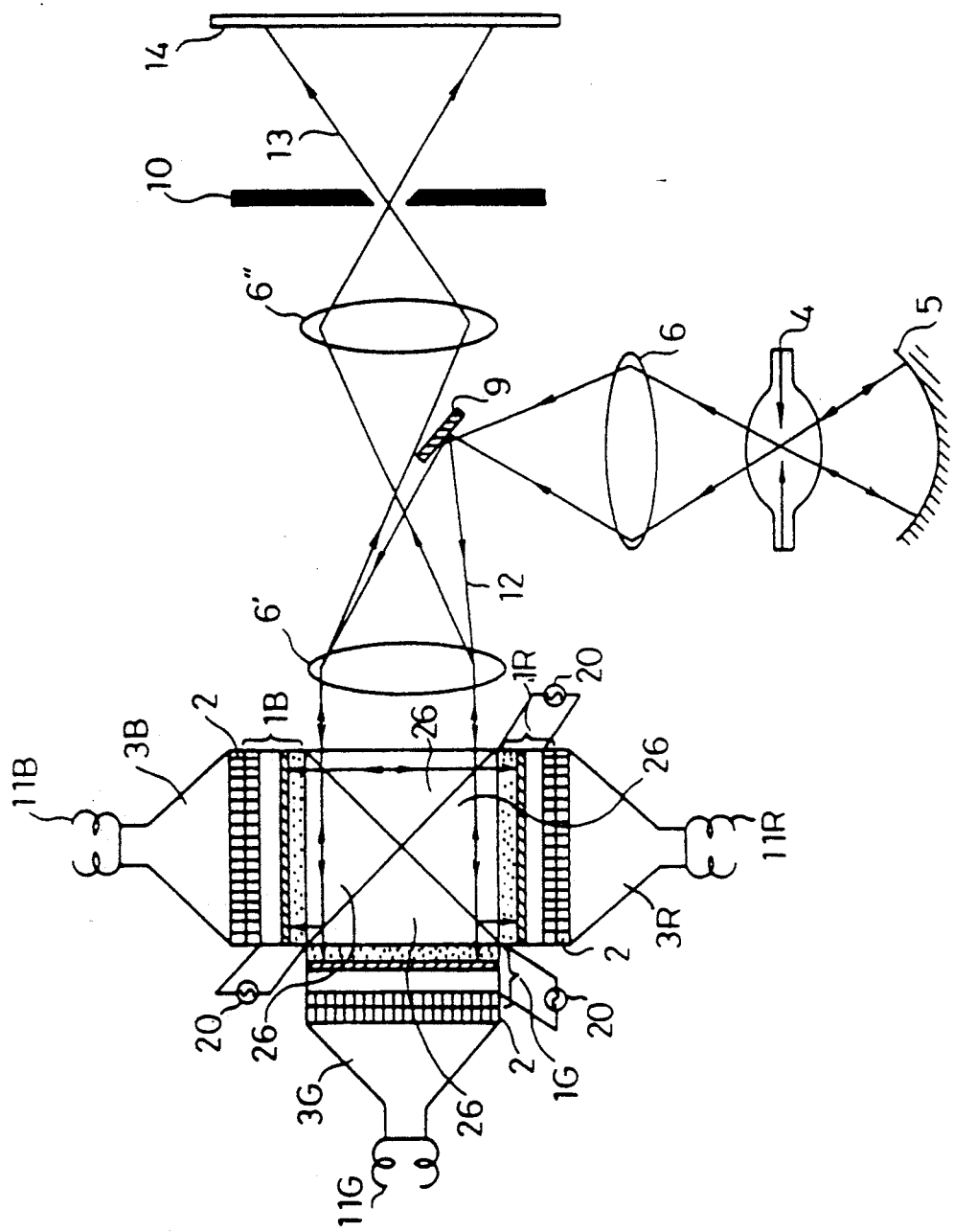

FIG. 5 shows still another arrangement of the light writing type projection display of the present invention. In the arrangement of FIG. 5, the dichroic mirrors 24 and 25 in the arrangement of FIG. 4 are removed and are replaced by four dichroic prisms 26. Incidentally, in FIG. 5, the light beams incident on and reflected from the spatial light modulators 1B, 1G and 1R are depicted as though they pass the same light paths, for simplicity. In reality, however, they pass slightly different paths as the light beams 12B and 13B, 12G and 13G, and 12R and 13R pass slightly different light paths as shown in FIG. 4.

Figure 6:
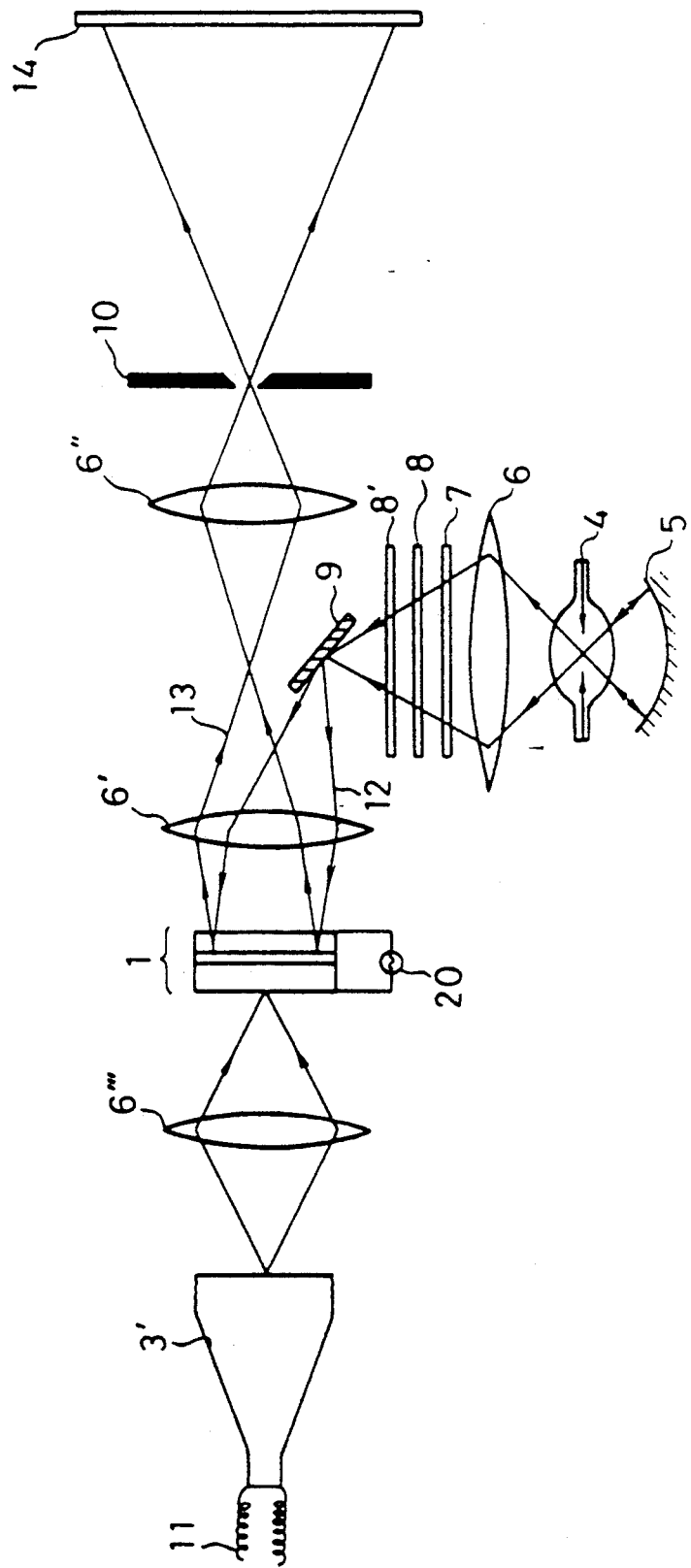

The light writing type projection display of the present invention can also use common conventional cathode ray tubes instead of the cathode ray tube with the fiber optic faceplate of FIG. 1. This type of display can be arranged as shown in FIG. 6: the image on a common conventional cathode ray tube 3' is focused on the spatial light modulator 1 through a lens 6'''. In this case, it is preferable to use a transparent glass substrate instead of the fiber optic plate 2' of the spatial light modulator 1. Likewise, the arrangements of the embodiments shown in FIGS. 4 and 5 can use the combination of the common conventional cathode ray tube 3' and the lens 6''' in place of cathode ray tubes the fiber optic faceplates.

Figure 7A:
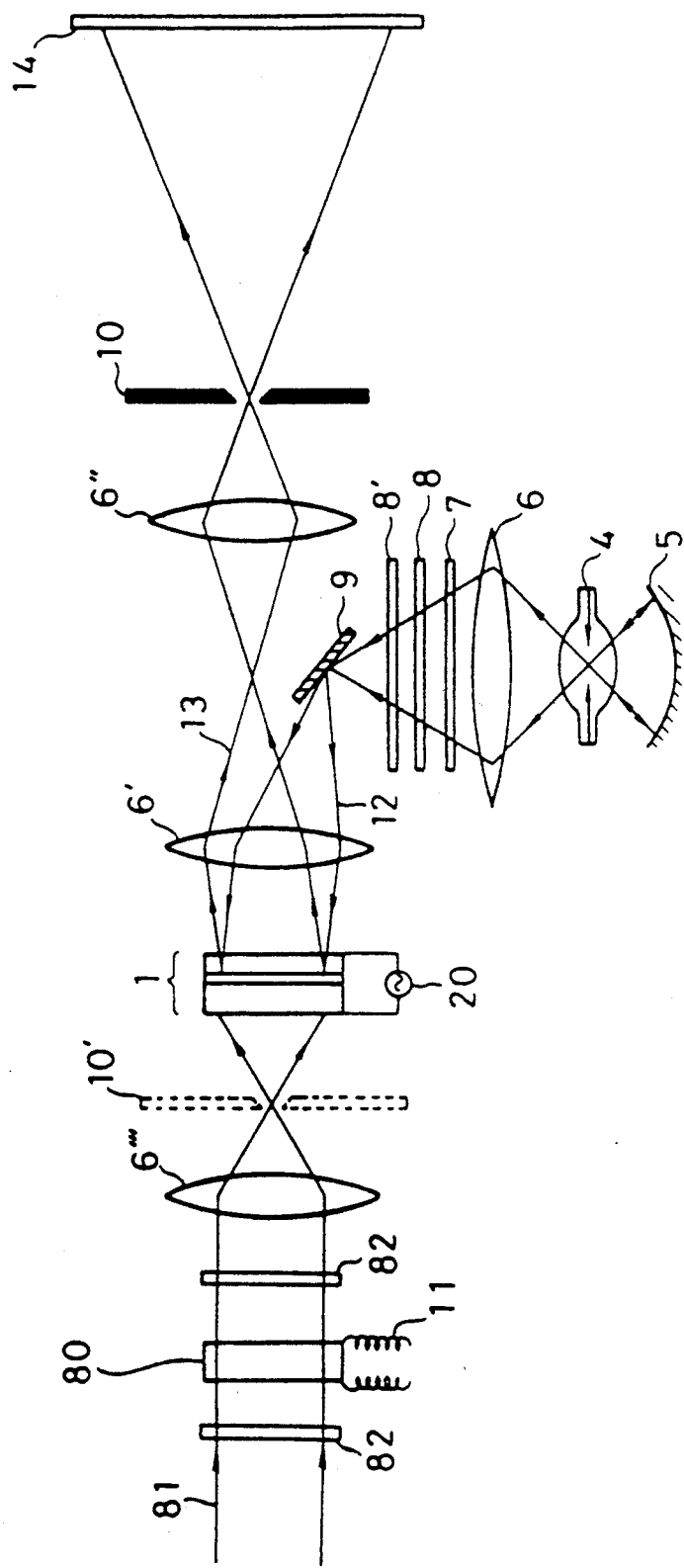

Furthermore, as shown in FIG. 7A, the light writing type projection display of the present invention can use a liquid crystal television set 80 instead of the cathode ray tube in FIG. 6. In FIG. 7A, reference numeral 82 designates a polarizer and reference numeral 81 designates a write light beam having a spectra that effectively produce the photoconductive effect of the photoconductive layer constituting the spatial light modulator 1. In addition, inserting a second aperture 10' between the lens 6''' and the spatial light modulator 1 so as to make the write light beam 81 coherent light makes it possible to eliminate unnecessary images of the liquid crystal television set 80 (such images as wiring of the matrix or the thin film transistor circuitry of the set projected on the screen). This makes it possible to write only original images on the spatial light modulator 1, thus achieving high quality projected images without nonuniformity.

In the arrangements of the embodiments shown in FIGS. 4 and 5, the combination of the liquid crystal television set 80 and the focusing lens 6''' can be used in place of the cathode ray tube with the fiber optic faceplate so as to construct the projection type displays.

Figure 7B:
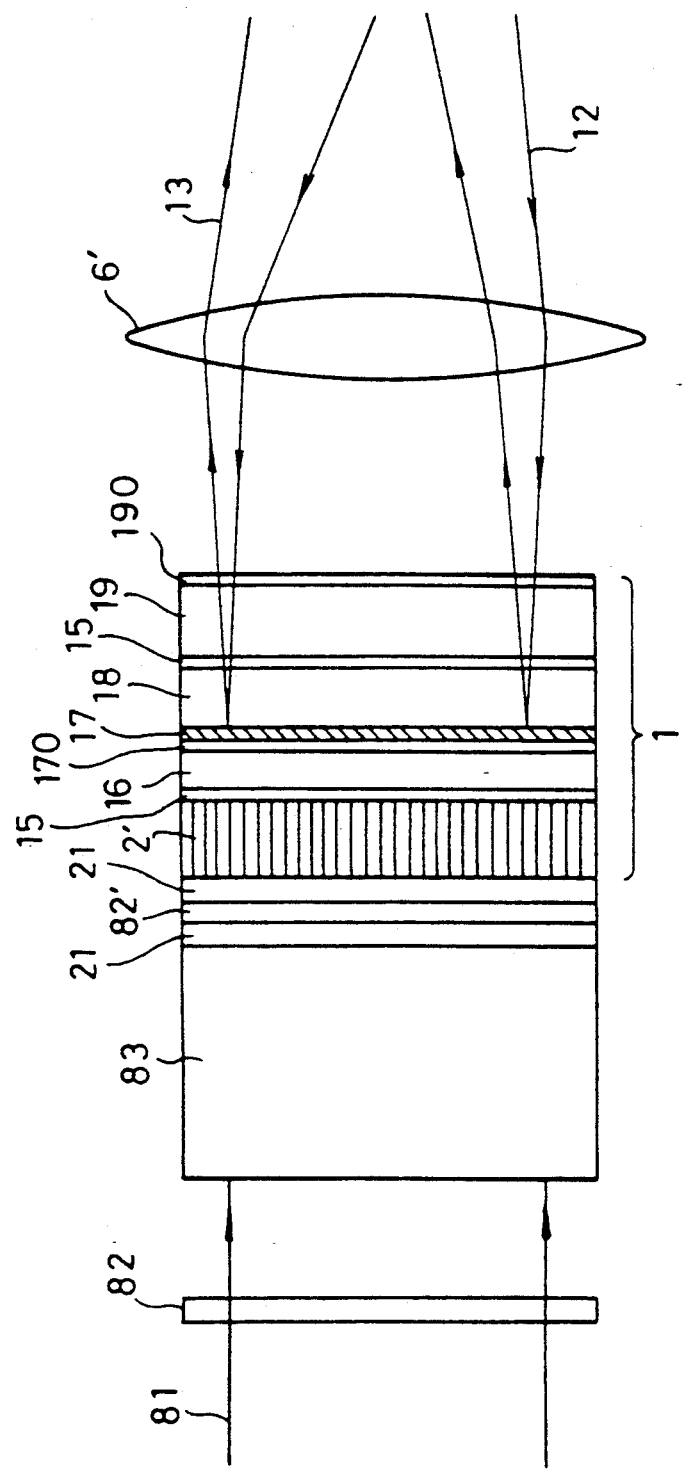
Figure 7C:
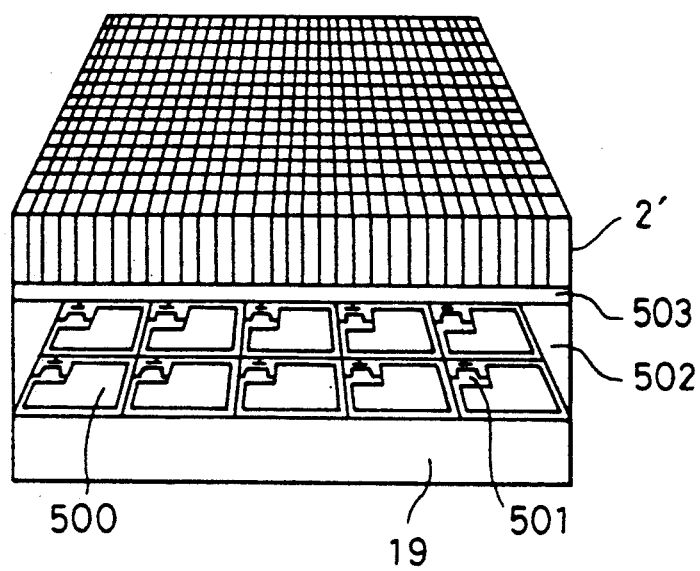
FIG. 7C is a perspective view showing an example of the arrangement of a liquid crystal television set having a fiber optic plate with a transparent common electrode.
Figure 8:
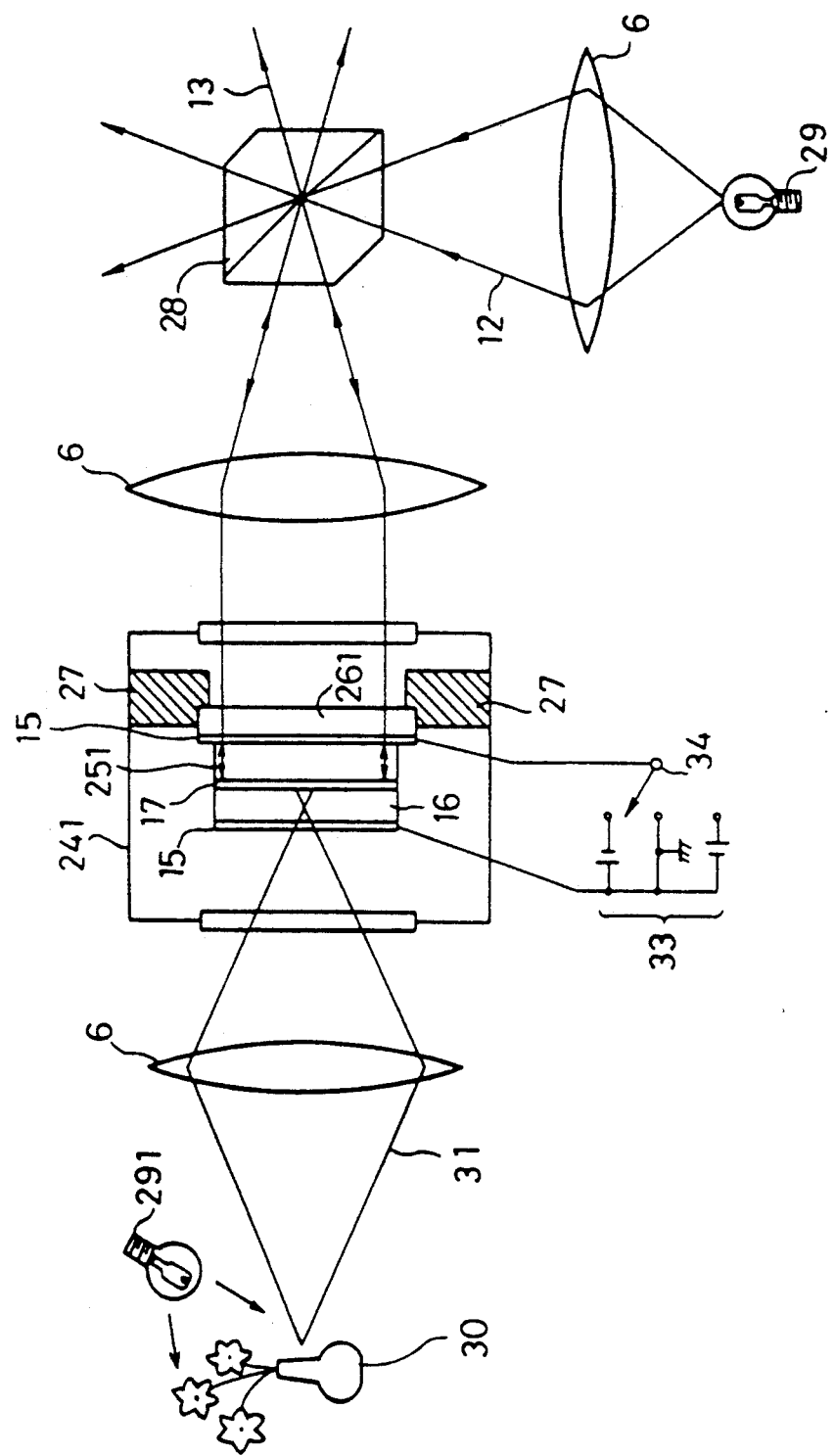
FIGS. 8–15 are schematic diagrams showing arrangements of conventional light writing type projection displays described in REFERENCES 1–5, and showing spatial light modulators that constitute the displays.

Furthermore, as shown in FIG. 7B, the lens 6''' can be removed by unitarily laminating the following elements in sequence: a liquid crystal television set 83 which will be described in more detail with reference to FIG. 7C; a transparent liquid layer 21; a polarizer 82'; a transparent liquid layer 21; and a spatial light modulator 1. In FIG. 7C, reference numeral 500 designates a transparent electrode, reference numeral 501, a thin film transistor, reference numeral 502 designates a liquid crystal layer, reference numeral 503 designates a transparent common electrode. The fiber optic plate 2' constituting the liquid crystal television set 83 is in contact with the transparent liquid layer 21 in FIG. 7B.

In particular, the polarizer 82' inserted between two fiber optic plates can be removed when guest-host type liquid crystals are used in the liquid crystal television set 83.

Furthermore, in the arrangements of the embodiments shown in FIGS. 4 and 5, the liquid crystal television set 83 can be used in place of the cathode ray tube with a fiber optic faceplate so as to construct projection type displays.

Figure 9:
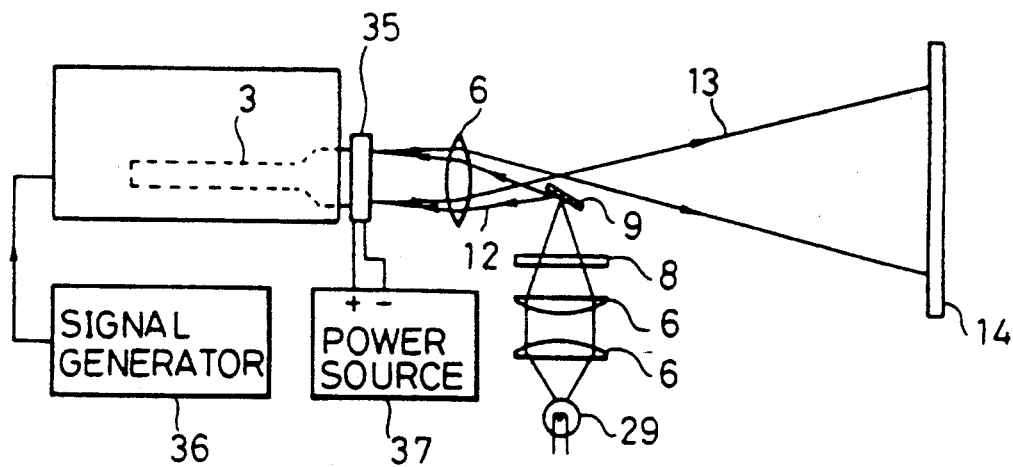
Figure 10:
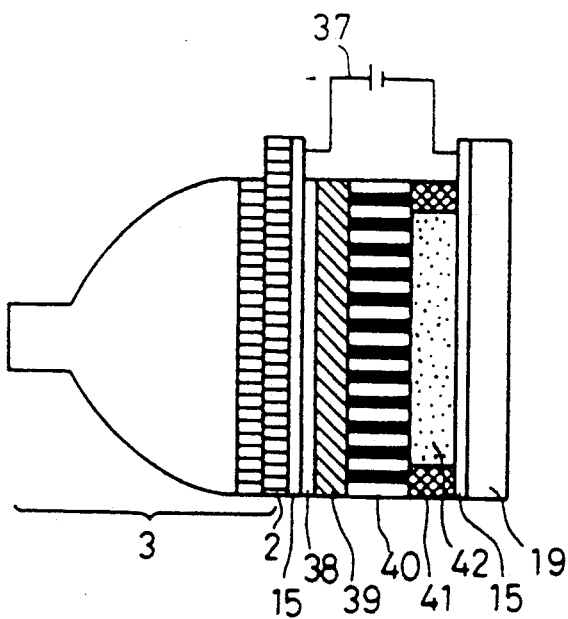
Figure 11:
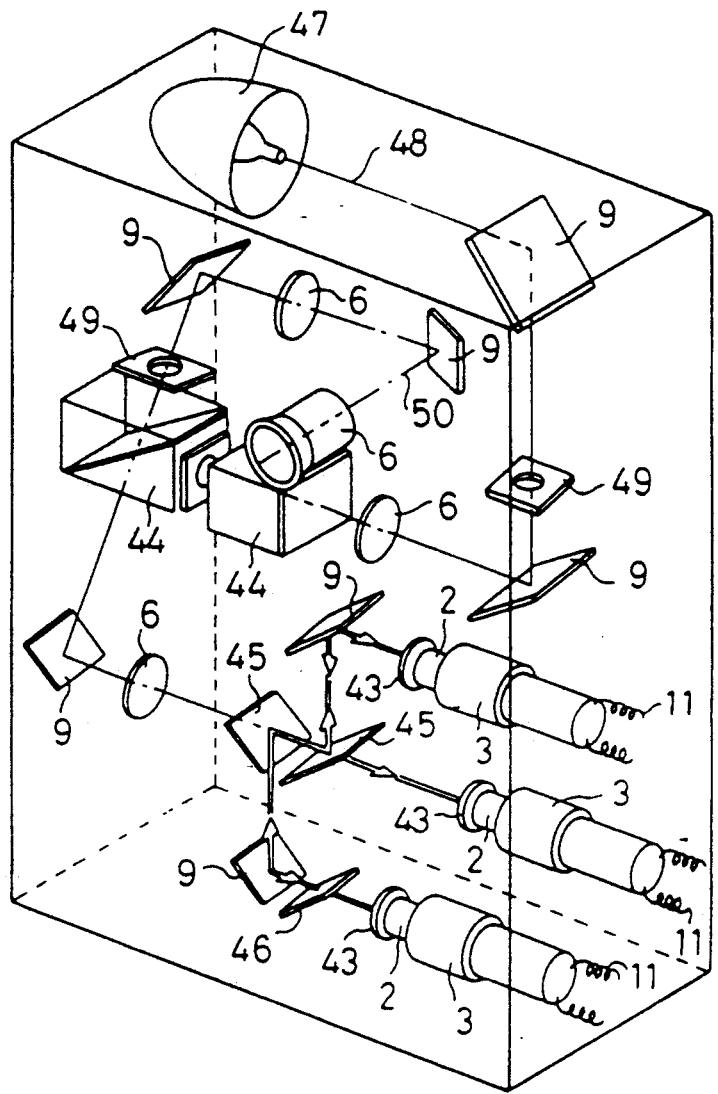
Figure 12:
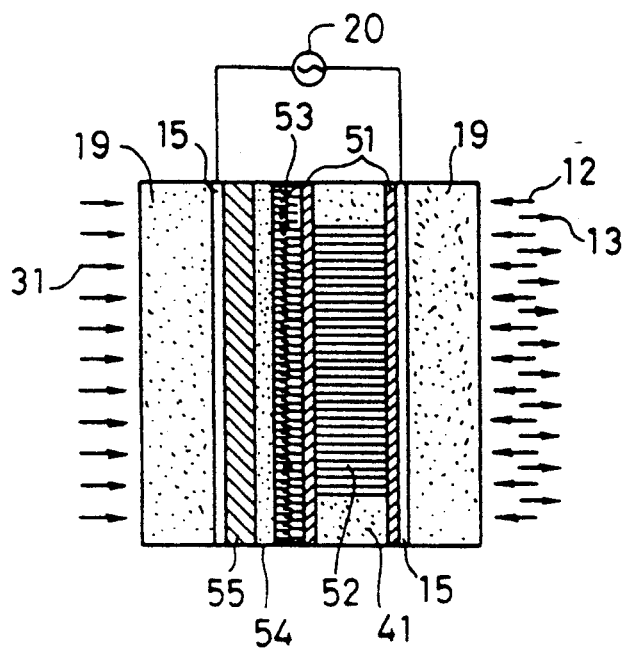
Figure 13:
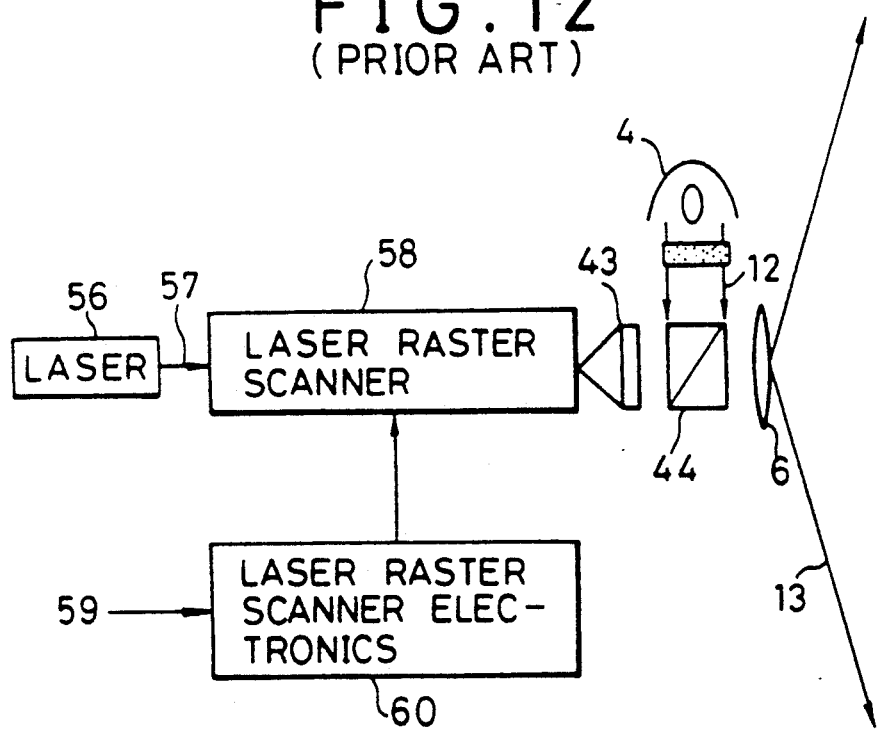
Figure 14:
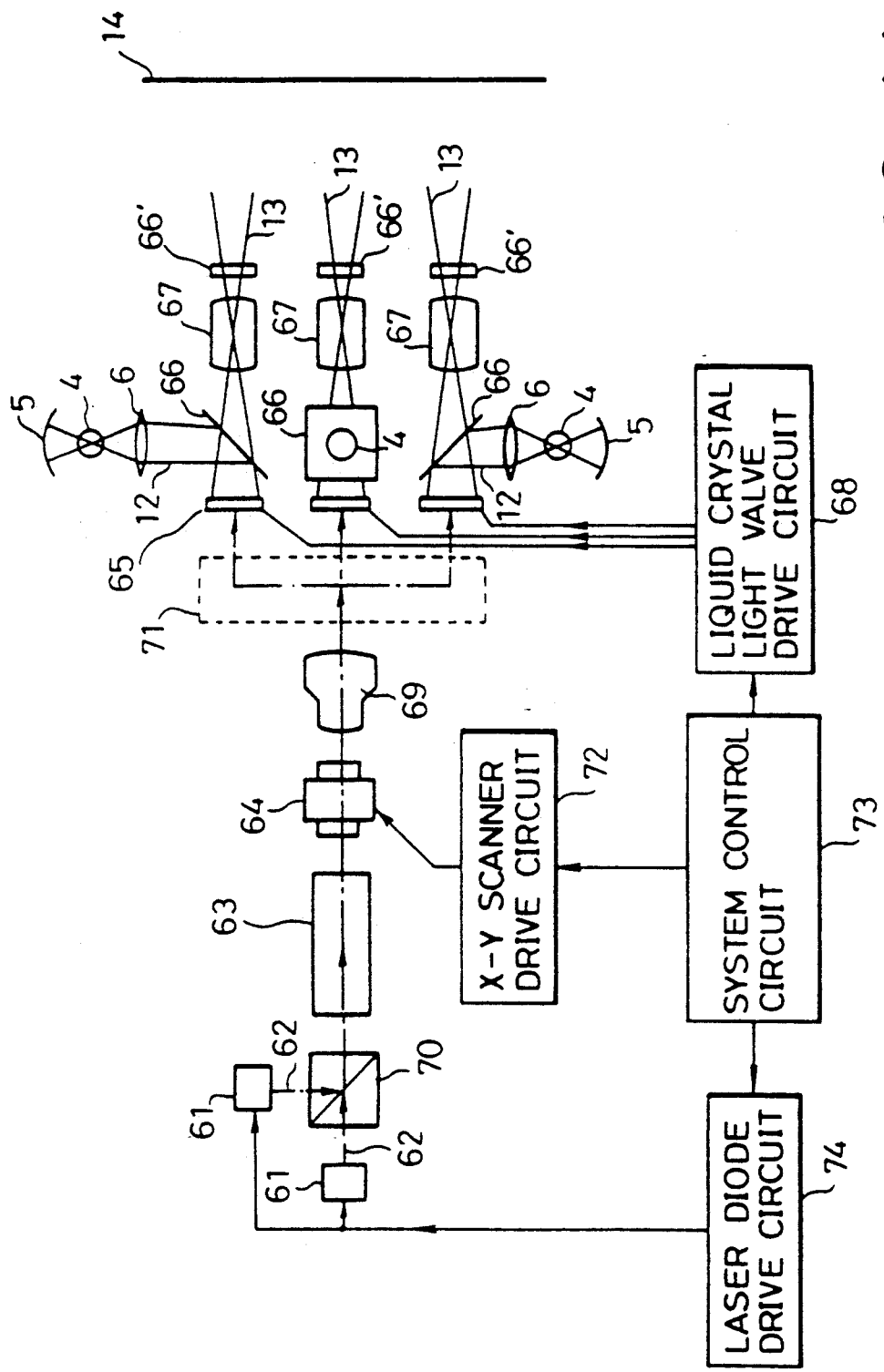
Figure 15:
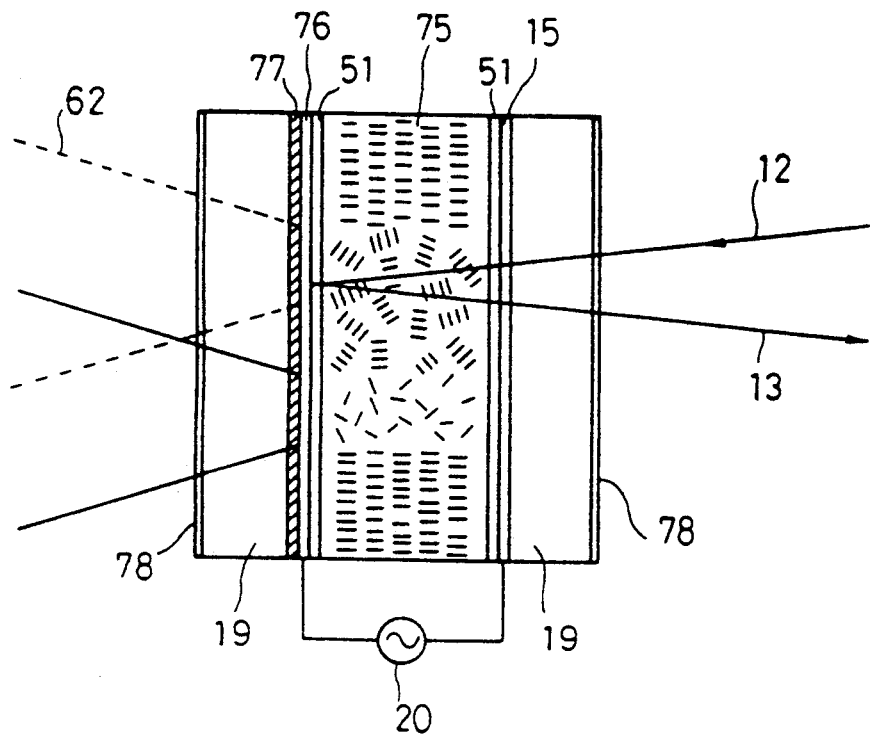

The projection type displays of the embodiments of the present invention described above with reference to FIGS. 1, 4, 5, 6 and 7 adopt a schlieren optical system in which the optical paths of the display light beam 12 and the projected light beam 13 are different. Although the conventional projected type displays of FIGS. 9 and 14 using the schlieren optical system can only display still images, the projected type displays of the present invention can display both still and motion images. Alternatively, the mirror 9 of FIGS. 1, 4, 5, 6 and 7A can be replaced with a half mirror (not shown) so that the optical paths of the display light beam 12 and the projected light beam 13 will coincide.

As a practical example, the display of FIG. 7B was set up by using a spatial light modulator 1 having the following elements: a photoconductive layer 16 of $Bi_{12}SiO_{20}$ having a thickness of 0.5 mm; a liquid crystal composition 18 having a thickness of 20 $\mu$m, which was made of cyanobiphenyl-based nematic liquid crystals and acryl resin; transparent electrodes 15 having a thickness of 70 nm; and a transparent glass substrate 19 having a thickness of 1 mm. The display could achieve good projected images as expected. Referring to FIG. 7A, a three-inch black and white pocket type liquid crystal television set was used as the liquid crystal television set 80. A 1 kW xenon lamp was used as the light source 4, and the color filter 8' cuts off light having a wavelength shorter than 560 nm. This display is preferably used as a projection type display, particularly, as a large screen display which could reproduce motion images of 1.4 m×1.1 m on the screen 14.

INDUSTRIAL APPLICABILITY

As described above, according to the present invention, the following distinctive effects can be obtained.

(1) The light writing type projection display of the present invention does not necessitate a polarizer and/or an analyzer. As a result, the display image of the present invention is of more than double the brightness of the image of the conventional projection type display that uses a polarizer and an analyzer.

(2) It does not necessitate the alignment processing which must be performed on the liquid crystals used in the conventional spatial light modulators. This makes it possible to fabricate large area spatial light modulators. Thus, high definition, bright, large area images can be easily displayed.

(3) It does not use the birefringence or optical rotatory power of liquid crystals. This reduces nonuniformity of the images.

(4) It is not necessary to highly collimate the display light beam incident on the spatial light modulator, and hence, the light emission area of the display light source can be made rather large. This achieves bright display images.

(5) The projection type display of the present invention has a short response time compared with a conventional light writing type projection display that uses a spatial light modulator composed of twisted nematic liquid crystals or dynamic scattering mode type liquid crystals: the total time of the rising and falling times of the spatial light modulator used by the present invention is on the order of several milliseconds to tens of milliseconds; this is much shorter than the total time (of 50 milliseconds to hundreds of milliseconds) of the rising and falling times of the conventional light write type spatial light modulator using twisted nematic liquid crystals.

(6) Since the spatial light modulator used by the present invention exhibits an input-output optical characteristic the $\gamma$ value of which is small, it is preferably used for displaying an analog light image. In contrast, the projection type display using a conventional light write type spatial light modulator has a large $\gamma$ value, which is not suitable for displaying analog light images.

(7) It can display motion images by using the schlieren optical system.

While the present invention has been described in details with respect to preferred embodiments, it will be understood that numerous modifications, changes, variations and equivalents will be made by those skilled in the art without departing from the spirit and scope of the invention. Accordingly, it is intended that the invention herein be limited only by the scope of the appended claims.

What is claimed is:

1. A light writing type projection display comprising:
   a spatial light modulator comprising:
      an antireflection film;
      a glass substrate;
      a liquid crystal composition including
         liquid crystals consisting of nematic liquid crystals, choresteric liquid crystals or smectic liquid crystals; and
         a transparent resin matrix, said liquid crystal composition comprising one of (a) said liquid crystals enclosed and scattered within said resin matrix, and (b) said resin matrix enclosed and scattered in said liquid crystals;
      a dielectric multilayer film mirror, said film mirror totally reflecting light having wavelengths in at least part of the visible spectra;
      an insulating light absorption layer, said light absorption layer absorbing the light beam transmitted through said dielectric multilayer film mirror; and a photoconductive layer, a transparent electrode, and a fiber optical plate, said photoconductive layer, transparent electrode and fiber optic plate being laminated in the recited sequence, said resin matrix having a refractive index equal to or approximately equal to one of (a) the ordinary refractive index of the liquid crystals, (b) the extraordinary refractive index of the liquid crystals, and (c) the refractive index of the liquid crystals when they are randomly oriented;

converting means comprising a display device, said display device being a liquid crystal television set illuminated by a light beam having spectra to which the photoconductive layer of the spatial light modulator responds, said light beam incident upon the photoconductive layer after passing through the liquid crystal television set;

illumination means including a visual light source emitting white light, said illumination means directing said white light to said spatial light modulator as a display light beam; and an image formation optical system comprising
a lens positioned parallel to said spatial light modulator; and
an aperture, a projected light beam reflected from said spatial modulator passing through said lens and aperture thereby forming an image, the optical path of the projected light beam differing from the optical path of the display light beam incident on said spatial light modulator when an electric field is applied to the spatial light modulator.

2. A light writing type projection display as claimed in claim 1, wherein said liquid crystal television set includes a fiber optic plate and a common, transparent electrode, the fiber optic plate of said liquid crystal television set being attached to the fiber optic plate of said spatial light modulator via a polarizer and a transparent liquid layer, the refractive index of said liquid layer being substantially the same as that of the fiber optic plate.

3. A light writing type projection display as claimed in claim 1, wherein said liquid crystal television set includes a fiber optic plate, a common, transparent electrode and a guest-host type liquid crystal, the fiber optic plate of said liquid crystal television set being attached to the fiber optic plate of the spatial light modulator via a transparent liquid layer, the refractive index of said liquid layer being substantially the same as that of the fiber optic plate.

4. A light writing type projection display comprising:
first, second, and third spatial light modulators, each of said light modulators comprising:
an antireflection film;
a glass substrate;
a liquid crystal composition including
liquid crystals consisting of nematic liquid crystals, choresteric liquid crystals or smectic liquid crystals; and
a transparent resin matrix, said liquid crystal composition comprising one of (a) said liquid crystals enclosed and scattered within said resin matrix, and (b) said resin matrix enclosed and scattered in said liquid crystals;

a dielectric multilayer film mirror, said film mirror totally reflecting light having wavelengths in at least part of the visible spectra;

an insulating light absorption layer, said light absorption layer absorbing the light beam transmitted through said dielectric multilayer film mirror;

a photoconductive layer, a transparent electrode, and a fiber optical plate, said photoconductive layer, transparent electrode and fiber optic plate being laminated in the recited sequence, said resin matrix having a refractive index equal to or approximately equal to one of (a) the ordinary refractive index of the liquid crystals, (b) the extraordinary refractive index of the liquid crystals, and (c) the refractive index of the liquid crystals when they are randomly oriented;

converting means having first, second, and third liquid crystal television sets, illuminated by light beams having spectra to which the photoconductive layers of the first, second and third spatial light modulators responds, said light beams being incident upon the photoconductive layers of the first, second and third spatial light modulators after passing through the first, second and third liquid crystal television sets;

optical means comprising
a visual light source emitting white light; and
means for separating said white light into a first light beam having wavelengths in the blue region, a second light beam having wavelengths in the green region, and a third light beam having wavelengths in the red region;

illumination means, said illumination means directing said first, second and third light beams onto said first, second and third spatial light modulators, respectively, as display light beams; and an image formation optical system comprising
a lens positioned parallel to said spatial modulator; and
an aperture, projected light beams reflected from said first, second and third spatial modulators passing through said lens and aperture thereby forming an image, the optical paths of the projected light beams differing from the optical paths of the display light beams incident on said first, second and third spatial light modulators when an electric field is applied to the first, second and third spatial light modulators, whereby a full-color image is displayed.

5. A light writing type projection display as claimed in claim 4, wherein each of the liquid crystal television sets includes a fiber optic plate and a common, transparent electrode, the fiber optic plate of each liquid crystal television set being attached to the fiber optic plate of each spatial light modulator via a polarizer and a transparent liquid layer, the refractive index of each of said liquid layers being substantially the same as that of the fiber optic plate.

6. A light writing type projection display as claimed in claim 4, wherein each of the liquid crystal television sets includes a fiber optic plate, a common, transparent electrode and guest-host type liquid crystals, the fiber optic plate of each liquid crystal television set being attached to the fiber optic plate of each spatial light modulator via a transparent liquid layer, the refractive index of each of said liquid layers being substantially the same as that of the fiber optic plate.

* * * * *